United States Patent [19]

Adam

[11] Patent Number: 5,049,161
[45] Date of Patent: Sep. 17, 1991

[54] MIXTURES OF DICYANOBENZANTHRONE COMPOUNDS

[75] Inventor: Jean-Marie Adam, Rosenau, France

[73] Assignee: Ciba-Geigy Corporation, Ardsley, N.Y.

[21] Appl. No.: 360,577

[22] Filed: Jun. 1, 1989

[30] Foreign Application Priority Data

Jun. 6, 1988 [CH] Switzerland .................... 2135/88

[51] Int. Cl.$^5$ .................... C09B 67/22; C07C 50/22
[52] U.S. Cl. .................... 8/638; 8/532; 8/922; 552/287
[58] Field of Search .................... 8/532, 922, 638; 260/352

[56] References Cited

U.S. PATENT DOCUMENTS 3,977,828 8/1976 Becker et al. .................... 8/532
4,801,406 1/1989 Schwander .................... 260/352

Primary Examiner—Paul Lieberman
Assistant Examiner—J. E. Darland
Attorney, Agent, or Firm—Edward McC. Roberts

[57] ABSTRACT

Dye mixtures particularly suitable for dyeing polyester material by the exhaust process containing at least two dicyanobenzanthrone compounds of the formula

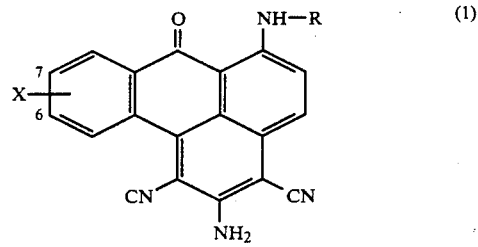

wherein R is hydrogen or a substituted or unsubstituted alkyl or aryl group and X is hydrogen or halogen located in the 6- or 7-position.

11 Claims, No Drawings

MIXTURES OF DICYANOBENZANTHRONE COMPOUNDS

The present invention relates to mixtures of dicyanobenzanthrone compounds, to processes for their preparation and to the use thereof as dyes for dyeing and printing semisynthetic or synthetic hydrophobic material.

The dye mixtures of the invention contain at least two different dicyanobenzanthrone compounds of the formula

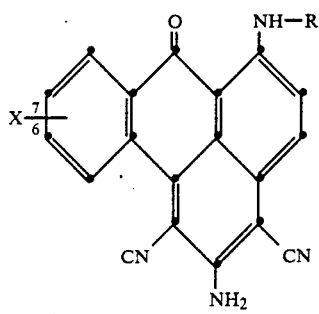

(1)

wherein R is hydrogen or a substituted or unsubstituted alkyl or aryl group and X is hydrogen or halogen located in the 6- or 7-position.

R as an alkyl radical is a substituted or unsubstituted, unbranched or branched alkyl radical or a cycloalkyl radical. The cycloalkyl radical preferably has 5 to 8 C atoms and the open-chain alkyl radical preferably has 1 to 8 C atoms.

Examples of possible unbranched or branched open-chain alkyl radicals are: methyl, ethyl, n- and iso-propyl, n-, sec- or tert-butyl, n- and iso-pentyl, n- and iso-hexyl or 2-ethylhexyl.

These alkyl radicals can be monosubstituted or polysubstituted, for example by $C_1-C_4$-alkoxy, by OH-substituted $C_1-C_4$-alkoxy or by phenyl, phenoxy or phenylaminocarbonyl, it being possible for the phenyl group in the last three radicals mentioned to be substituted e.g. by $C_1-C_4$-alkyl, $C_1-C_4$-alkoxy or phenoxy. Examples of suitable radicals of this type are: hydroxyethyl, 1-hydroxyisopropyl, ethoxymethyl, 2-hydroxyethoxypentyl, benzyl, 1-phenylethyl, 2-phenylethyl, 1-methyl-2-phenylethyl, 1-isobutyl-3-phenylpropyl, 1,5-diphenylpent-3-yl, 1-methyl-2-phenoxyethyl or 1-methyl-2-phenylaminocarbonylethyl.

R as a substituted or unsubstituted $C_5-C_8$-cycloalkyl radical is in particular the cyclopentyl or cyclohexyl radical; possible substituents are in particular $C_1-C_4$-alkyl groups, especially the $CH_3$ group.

R as an aryl radical is in particular a naphthyl radical or especially a phenyl radical, it being possible for these radicals to be substituted e.g. by $C_1-C_4$-alkyl, $C_1-C_4$-alkoxy, halogen such as fluorine, chlorine or bromine, nitro, $C_1-C_4$-alkylcarbonylamino or $C_1-C_4$-alkoxycarbonyl.

In preferred mixtures of dyes of formula (1), R is in each case $C_1-C_6$-alkyl which is unsubstituted or substituted by phenyl, phenoxy or phenylaminocarbonyl, it being possible for the phenyl group in the last three radicals mentioned to be substituted by $C_1-C_4$-alkyl, $C_1-C_4$-alkoxy or phenoxy, or phenyl which is unsubstituted or substituted by $C_1-C_4$-alkyl.

In the mixtures of dyes of formula (1), X is in each case halogen such as bromine or, in particular, chlorine, which is located in the 6- or 7-position, or especially hydrogen.

Because of their good dyeing properties, especially because of the good exhaust capacity from an aqueous dyebath, it is especially preferred to use dye mixtures containing 20–80% by weight of a dye of the formula

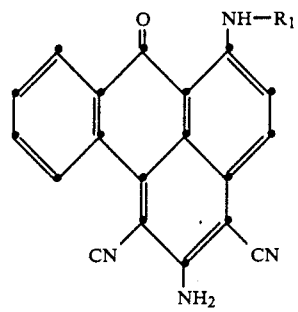

(2)

wherein $R^1$ is $C_3-C_5$-alkyl, cyclohexyl or phenyl-$C_3-C_5$-alkyl, and 80–20% by weight of a dye of the formula

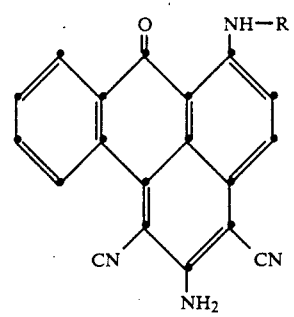

(3)

wherein R is hydrogen or a substituted or unsubstituted alkyl or aryl group.

$R^1$ is preferably n-butyl, sec-butyl or 1-methyl-3-phenylpropyl.

The meanings and preferences already listed under formula (1) also apply to R in formula (3). The especially preferred meaning of R is open-chain $C_1-C_6$-alkyl which is unsubstituted or substituted by phenyl, or cyclohexyl.

Especially preferred mixtures contain 40–60% by weight of a dye of formula (2) in which $R^1$ is n-butyl, sec-butyl or 1-methyl-3-phenylpropyl, and 60–40% by weight of a dye of formula (3) in which R is open-chain $C_1-C_6$-alkyl which is unsubstituted or substituted by phenyl, or cyclohexyl.

The dicyanobenzanthrone compounds of formulae (1), (2) and (3) are known from European patent application 238.443. They are obtained e.g. by reacting an aminoanthraquinone of the formula

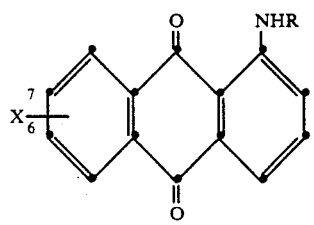

(4)

wherein X and R are as defined under formula (1), with malononitrile in an inert solvent, in the presence of titanium tetrachloride and a tertiary amine.

The dye mixtures of the invention, containing at least two dyes of formula (1), are preferably obtained by preparing the dyes individually, e.g. as described in European patent application 238.443, and then mixing the together. They can be mixed e.g. in an organic solvent, in aqueous dispersion or in the dry form. It is preferred to mix the dry dyes together with a dispersant and then to grind the mixture, with the addition of water if necessary, until a dispersion of the desired particle size is obtained.

Another possible method of preparing the dye mixtures of the invention consists in reacting a mixture of at least two different aminoanthraquinones of formula (4) with malononitrile in an inert solvent, in the presence of titanium tetrachloride and a tertiary amine. Examples of suitable inert solvents for the reaction of the aminoanthraquinones of formula (4) with malononitrile are aliphatic hydrocarbons such as n-pentane, n-hexane or n-heptane, chlorinated hydrocarbons such as methylene chloride, chloroform or carbon tetrachloride, ethers such as diethyl ether, or aromatic compounds such as nitrobenzene or halogenobenzenes. It is preferred to use a chlorinated hydrocarbon, in particular methylene chloride.

Examples of tert-amines used are aliphatic amines such as triethyl-amine, or, in particular, aromatic amines such as picoline or pyridine.

At least 2 mol, but preferably 2.2 to 3 mol, of malononitrile are used per mol of anthraquinone compound of formula (4). A larger excess is generally not detrimental, but not advantageous. The amount of titanium tetrachloride is preferably 2 to 10 mol, especially 3 to 6 mol, per mol of anthraquinone compound of formula (4).

The tertiary amine is used in at least the amount necessary to bind the acid formed. In general, however, the tertiary amine is used in excess, preferably in an amount of 2 to 6 mol per mol of titanium tetrachloride.

The reaction temperature is generally between about $-10°$ and $+60°$ C., preferably between $0°$ and $25°$ C.

The mixtures of dyes of formula (1) of the invention can be used as dyes for dyeing and printing semisynthetic and especially synthetic hydrophobic fibre materials, in particular textile materials. Textile materials made of blended woven fabrics containing such semisynthetic or synthetic hydrophobic textile materials can also be dyed or printed with the aid of the compounds of the invention.

Possible semisynthetic textile materials are, in particular, cellulose $2\frac{1}{2}$-acetate and cellulose triacetate.

Synthetic hydrophobic textile materials consist in particular of linear aromatic polyesters, for example those derived from terephthalic acid and glycols, especially ethylene glycol, or condensation products of terephthalic acid and 1,4-bis(hydroxymethyl)hexahydrobenzene; polycarbonates, e.g. those derived from α,α-dimethyl-4,4'-dihydroxydiphenyl-methane and phosgene; or fibres based on polyvinyl chloride and polyamide.

The application of the compounds of the invention to the textile materials is carried out by known dyeing processes. For example, polyester fibre materials are dyed in the exhaust process from aqueous dispersion, in the presence of conventional anionic or non-ionic dispersants and, if necessary, conventional swelling agents (carriers), at temperatures of between $80°$ and $140°$ C.

Cellulose $2\frac{1}{2}$-acetate is preferably dyed at between about $65°$ and $85°$ C. and cellulose triacetate at temperatures up to $115°$ C.

Wool and cotton present in the dyebath at the same time are only slightly dyed, if at all, by the novel dyes (very good reserve), so these dyes can also be used satisfactorily for dyeing the polyester in polyester/wool and polyester/cellulose fibre blends.

Compared with the known individual dyes of formula (1), the dye mixtures of the invention, containing at least two of these dyes, are distinguished by a considerably improved exhaust capacity on polyester material. Whereas the individual dyes are only partially suitable for the aqueous exhaust process, in particular for dyeing in deep shades, the dye mixtures of the invention give very good fixation yields also in the exhaust process.

The dye mixtures of the invention are also suitable for dyeing by the thermosol method and for textile printing.

The said textile material can be in a very wide variety of processed forms, e.g. as fibres, filaments or bonded web or as woven or knitted fabrics.

It is advantageous to convert the dye mixtures of the invention into a dye preparation before they are used. This is done by grinding the dyes to give a mean particle size of between 0.01 and 10 micrometers. The grinding can be carried out in the presence of dispersants. For example, the dried dyes are ground with a dispersant or kneaded in paste form with a dispersant and then dried under vacuum or by atomization. The preparations obtained in this way can be used for dyeing and printing, after the addition of water.

Printing will be carried out using the conventional thickeners, e.g. modified or unmodified natural products, for example alginates, British gum, gum arabic, starch gum, carob beam flour, tragacanth, carboxymethyl cellulose, hydroxyethyl cellulose or starch, or synthetic products, for example polyacrylamides, polyacrylic acid or copolymers thereof or polyvinyl alcohols.

The dye mixtures of the invention give the said materials, in particular the polyester material, level bluish red to violet shades with very good general use fastness properties such as, in particular, good lightfastness, good fastness to sublimation, fastness to heat setting, pleating and chlorine, and wetfastness such as fastness to water, perspiration and washing; the finished dyeings are further characterized by a good pH stability and very good fastness to rubbing. Moreover, very intensely coloured dyeings are obtained which do not exhibit catalytic fading.

The dye mixtures of the invention are also suitable for colouring and pigmenting high-molecular organic materials, e.g. cellulose ethers and esters, natural resins or synthetic resins such as polymerization resins or condensation resins.

The above-mentioned use of the mixtures of dyes of formula (1) of the invention is also a subject of the present invention, such as a process for dyeing or printing semisynthetic or synthetic fiber material, especially textile material, which consists in applying a mixture of several compounds of formula (1) to the said mateiral or incorporating it therein. The said hydrophobic fiber material is preferably polyester textile material. Other substrates which can be treated by the process of the invention, and preferred process conditions, can be found above in the more detailed explanation of the use of the compounds of the invention.

A further subject of the invention is the hydrophobic fiber material, preferably polyester textile material, dyed or printed by the said process.

The following Examples illustrate the invention further without implying a limitation. Parts and percentages are by weight, unless indicated otherwise. The temperatures are in degrees Celsius.

EXAMPLE 1

23 ml of titanium tetrachloride are added dropwise over 30 minutes, at a temperature of 0°-5°, with vigorous stirring, to a mixture consisting of 11.5 g of the compound of the formula

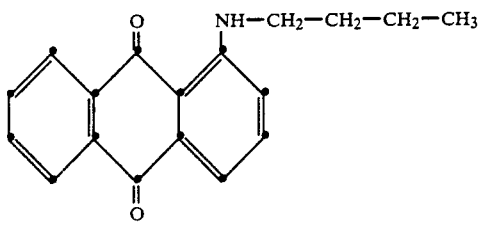

7 g of malononitrile and 250 ml of methylene chloride, and 70 ml of pyridine are then added dropwise over 30 minutes at the same temperature. The mixture is subsequently stirred for a further 2 hours, the temperature being allowed to rise to 20°. The volatile components are then removed under vacuum in a rotary evaporator, after which the residue is treated with 200 ml of 2N HCl, isolated by filtration and rinsed with 2N HCl. The material on the suction filter is then washed with water until the washings are neutral, and subsequently with methanol to remove brown by-products. After intermediate drying, the product is recrystallized from 10 parts of ethyl cellosolve to give the dye of the formula

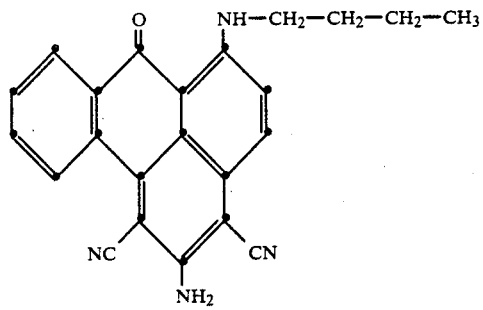

as a dark violet powder.

EXAMPLE 2

23 ml of titanium tetrachloride are added dropwise over 30 minutes, at a temperature of 0°-5°, with vigorous stirring, to a mixture consisting of 14.2 g of the compound of the formula

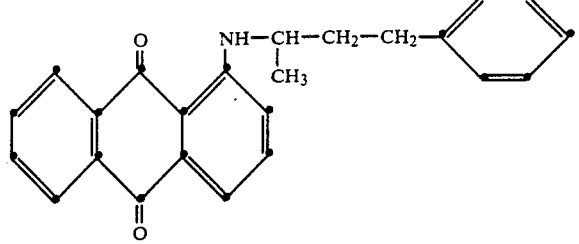

7 g of malononitrile and 250 ml of methylene chloride, and 70 ml of pyridine are then added dropwise over 30 minutes at the same temperature. The mixture is subsequently stirred for a further 2 hours, the temperature being allowed to rise to 20°. The volatile components are then removed under vacuum in a rotary evaporator, after which the residue is treated with 200 ml of 2N HCl, isolated by filtration and rinsed with 2N HCl. The material on the suction filter is then washed with water until the washings are neutral, and subsequently with methanol to remove brown by-products. After intermediate drying, the product is recrystallized from 10 parts of ethyl cellosolve to give the dye of the formula

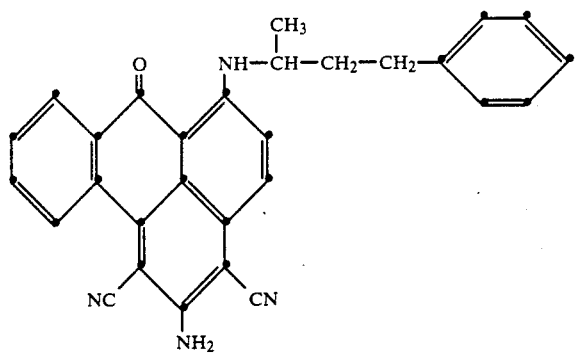

as a dark violet powder.

EXAMPLE 3

1 part of each of the dry unblended dyes according to Example 1 and Example 2 are mixed together with 2 parts of dinaphthylmethanedisulfonate (Na salt) and water in a glass bead mill and the mixture is ground until the particle size is about 2 μ or less. The paste formed, which consists of the dye, dispersant and water, is then 6 parts of sodium ligninsulfonate are added. The resulting paste is then subjected to spray drying to give a pulverulent dyeing preparation.

This dyeing preparation can be used for dyeing polyester materials by the HT process, the dyebath having a good dispersion stability. A bluish red polyester dyeing with good lightfastness is obtained.

The exhaust capacity of the mixture is distinctly better than that of the individual dyes.

EXAMPLE 4-17

If the mixtures of 1-alkylaminoanthraquinones listed in the following Table are used, the procedure otherwise being the same as in Example 3, dyeings in bluish red shades are obtained on polyester, the exhaust capacity of the dye mixtures being considerably better than that of the individual dyes.

TABLE

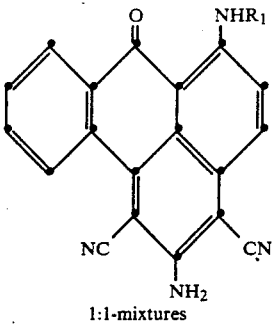

1:1-mixtures

| Example | R₁ | R₂ | Shade on PES |
|---|---|---|---|
| 4 | —CH₃ | —CH(CH₃)₂ | bluish red |
| 5 | —CH₃ | —CH₂CH₂CH₂CH₃ | bluish red |
| 6 | —CH(CH₃)₂ | —CH₂CH₂CH₂CH₃ | bluish red |
| 7 | —CH₃ | —CH(CH₃)—CH₂—CH₂—C₆H₅ | bluish red |
| 8 | —CH(CH₃)₂ | —CH(CH₃)—CH₂—CH₂—C₆H₅ | bluish red |
| 9 | —CH₃ | —C₆H₁₁ (cyclohexyl) | bluish red |
| 10 | —CH(CH₃)₂ | —C₆H₁₁ (cyclohexyl) | bluish red |
| 11 | —CH₂CH₂CH₂CH₃ | —C₆H₁₁ (cyclohexyl) | bluish red |
| 12 | —CH(CH₃)—CH₂—CH₂—C₆H₅ | —C₆H₁₁ (cyclohexyl) | bluish red |
| 13 | —CH₃ | —CH(CH₃)—CH₂CH₃ | bluish red |
| 14 | —CH(CH₃)₂ | —CH(CH₃)—CH₂CH₃ | bluish red |
| 15 | —CH₂CH₂CH₂CH₃ | —CH(CH₃)—CH₂CH₃ | bluish red |
| 16 | —CH(CH₃)—CH₂—CH₂—C₆H₅ | —CH(CH₃)—CH₂CH₃ | bluish red |

TABLE-continued

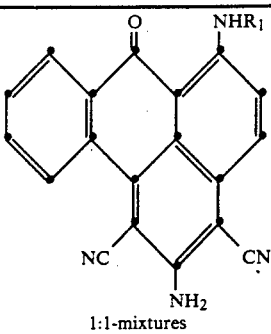

1:1-mixtures

| Example | R₁ | R₂ | Shade on PES |
|---|---|---|---|
| 17 | —⟨H⟩ | —CH(CH₃)—CH₂CH₃ | bluish red |

What is claimed is:

1. A dye mixture containing approximately equal amounts of two different dicyanobenzanthrone compounds of the formula

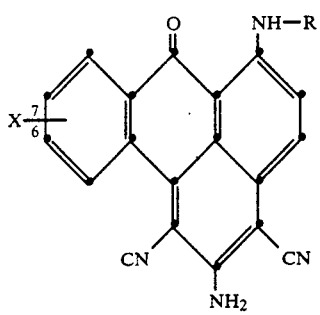

(1)

wherein R is hydrogen or a substituted or unsubstituted $C_1$-$C_8$-alkyl or aryl group and X is hydrogen or halogen located in the 6- or 7-position.

2. A dye mixture according to claim 1 in which R is a substituted or unsubstituted, unbranched or branched alkyl radical, a cycloalkyl radical or a substituted or unsubstituted naphthyl or phenyl radical.

3. A dye mixture according to claim 2 in which R is an open-chain alkyl radical, which is unsubstituted or substituted by $C_1$-$C_4$-alkoxy, by OH-substituted $C_1$-$C_4$-alkoxy or by phenyl, phenoxy or phenylaminocarbonyl, it being possible for the phenyl group in the last three radicals mentioned to be substituted by $C_1$-$C_4$-alkyl, $C_1$-$C_4$-alkoxy or phenoxy, or a $C_5$-$C_8$-cycloalkyl radical which is unsubstituted or substituted by $C_1$-$C_4$-alkyl, or a naphthyl or phenyl radical which is unsubstituted or substituted by $C_1$-$C_4$-alkyl, $C_1$-$C_4$-alkoxy, halogen nitro, $C_1$-$C_4$-alkylcarbonylamino or $C_1$-$C_4$-alkoxycarbonyl.

4. A dye mixture according to claim 3 in which R is $C_1$-$C_6$-alkyl which is unsubstituted or substituted by phenyl, phenoxy or phenylaminocarbonyl, it being possible for the phenyl group in the last three radicals mentioned to be substituted by $C_1$-$C_4$-alkyl, $C_1$-$C_4$-alkoxy or phenoxy, or phenyl which is unsubstituted or substituted by $C_1$-$C_4$-alkyl.

5. A dye mixture according to claim 1 in which X is hydrogen.

6. A dye mixture which contains 20–80% by weight of a dye of the formula

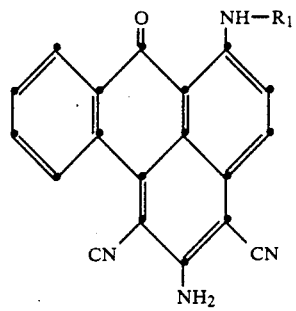

(2)

wherein $R^1$ is $C_3$-$C_5$-alkyl, cyclohexyl or phenyl-$C_3$-$C_5$-alkyl, and 80–20% by weight of a dye of the formula

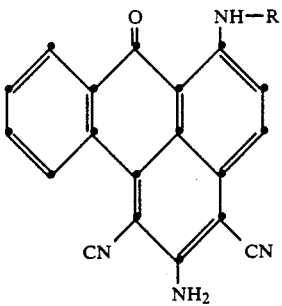

(3)

wherein R is hydrogen or a substituted or unsubstituted alkyl or aryl group.

7. A dye mixture according to claim 6 in which $R^1$ is n-butyl, sec-butyl or 1-methyl-3-phenylpropyl.

8. A dye mixture according to claim 6 in which R is open-chain $C_1$-$C_6$-alkyl which is unsubstituted or substituted by phenyl, or cyclohexyl.

9. A dye mixture according to claim 6 which contains 40–60% by weight of a dye of formula (2) in which $R^1$ is n-butyl, sec-butyl or 1-methyl-3-phenylpropyl, and 60–40% by weight of a dye of formula (3) in which R is open-chain $C_1$-$C_6$-alkyl which is unsubstituted or substituted by phenyl, or cyclohexyl.

10. A process for dyeing or printing semisynthetic or synthetic textile fibers comprising the step of applying a dye mixture of claim 1 thereto.

11. The textile fibers dyed or printed according to claim 10.

* * * * *